United States Patent [19]

Grisebach et al.

[11] 4,428,710
[45] Jan. 31, 1984

[54] MANIPULATOR WITH A SWIVEL JIB

[76] Inventors: Hans T. Grisebach, Kampstrasse 7, 4750 Unna; Rudolf Betzing, Vogelherd 3, 5800 Hagen; Volker Betzing, Vogelherd 3, 5800 Hagen; Ulrich Betzing, Vogelherd 3, 5800 Hagen; Klaus Betzing, Vogelherd 3, 5800 Hagen, all of Fed. Rep. of Germany

[21] Appl. No.: 209,482

[22] Filed: Nov. 24, 1980

Related U.S. Application Data

[63] Continuation of Ser. No. 943,489, Sep. 18, 1978, abandoned.

[51] Int. Cl.³ .................... B25J 11/00; F16H 25/20
[52] U.S. Cl. .................................... 414/590; 414/735; 414/744 A
[58] Field of Search ................. 414/4, 5, 589, 590, 414/591, 735, 744 R, 744 A, 744 B, 744 C, 223, 225, 226

[56] References Cited

U.S. PATENT DOCUMENTS

| 1,903,916 | 4/1933 | Stenhouse et al. | 414/744 A |
| 3,247,978 | 4/1966 | Neumeier | 414/735 |
| 3,665,148 | 5/1972 | Yasenchak et al. | 219/86.33 X |
| 3,731,822 | 5/1973 | Friesen et al. | 414/744 R X |
| 3,743,909 | 7/1973 | Ritchie | 227/130 X |
| 4,015,721 | 4/1977 | Scheler | 414/744 A |

FOREIGN PATENT DOCUMENTS 453292  2/1975  U.S.S.R. ................. 414/744 A

Primary Examiner—Leslie J. Paperner
Attorney, Agent, or Firm—William E. Jackson

[57] ABSTRACT

A manipulator having at least one jib which can be swivelled about a vertical shaft is disclosed. The vertical shaft is arranged on a support member. The jib may carry a positioning unit having load-holding members mounted thereon.

9 Claims, 30 Drawing Figures

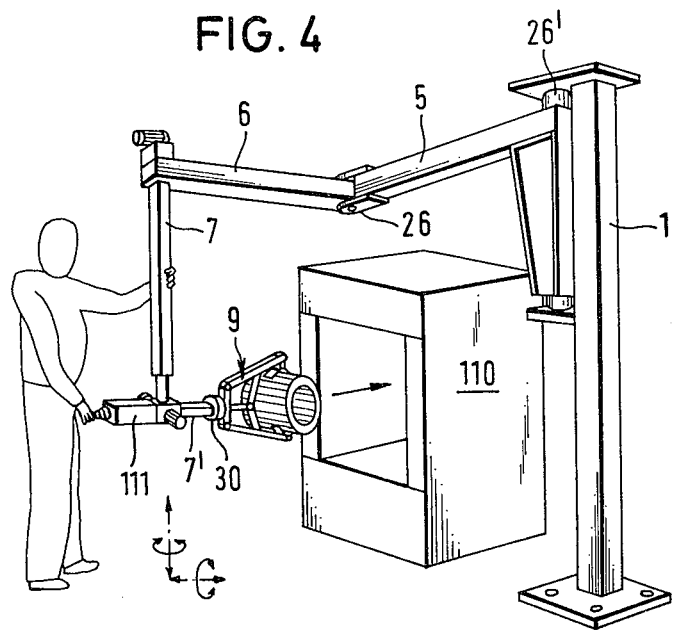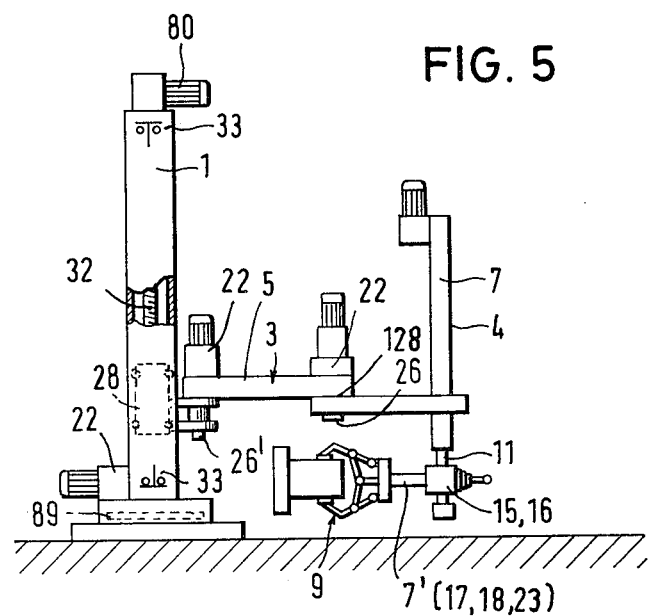

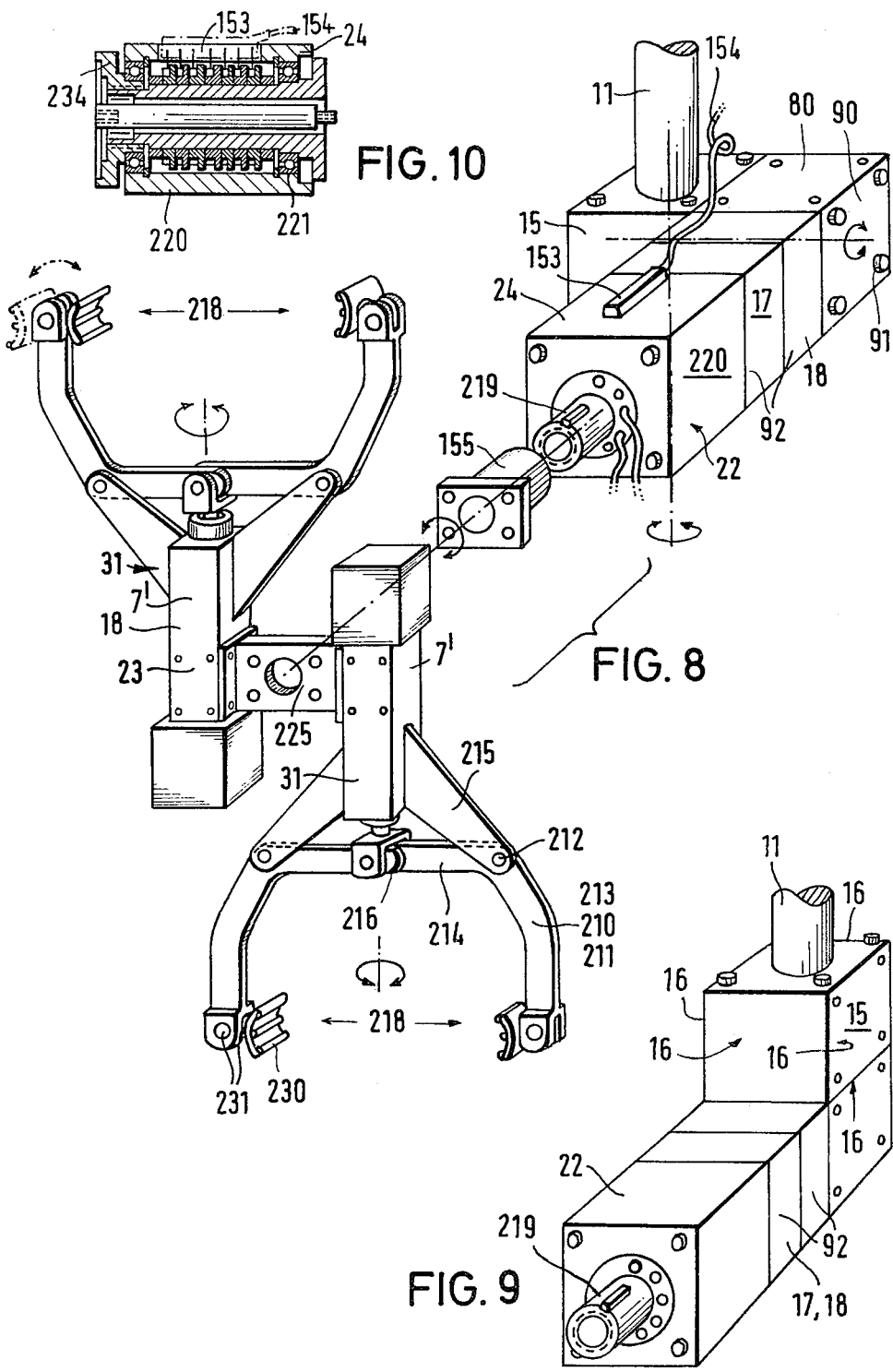

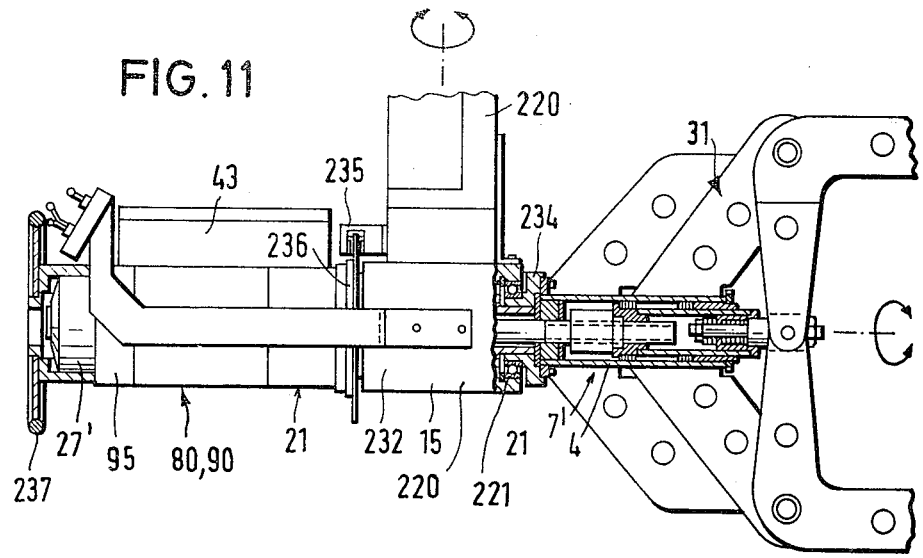
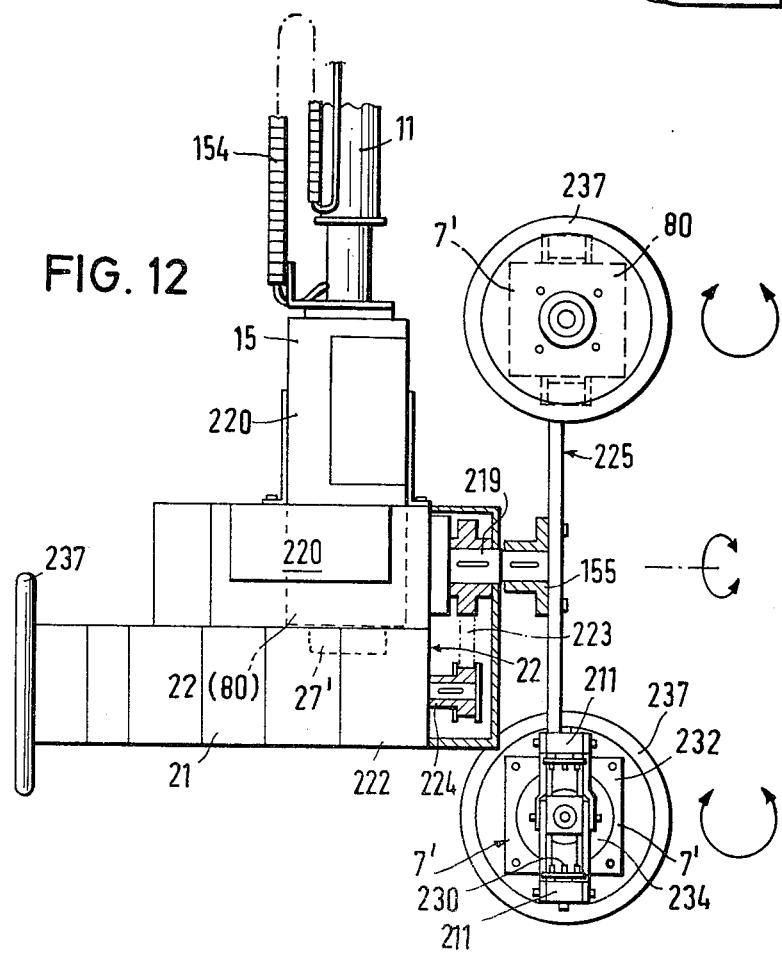

MANIPULATOR WITH A SWIVEL JIB

This is a continuation of application Ser. No. 943,489, filed Sept. 18, 1978, abandoned.

The invention relates to manipulators having at least one jib which can be swivelled about a vertical shaft arranged on a support member and which carries, at varying radial distances, parts of a positioning unit, which extends at an angle of approximately 90° to the jib and is equipped with telescopic elements and at the free end of which load-holding members are rotatably mounted.

Appliances of the above-described kind are known in the form of materials-handling equipment which is moved and guided manually, but they are not applied in the sense of manipulators since the design of the known forms does not enable them to operate as remote-controlled or automatic units, since the known appliances are not capable of holding the load at a specific point in space, but constitute, more or less, a substitute for chain-type lifting tackle which is widely used on the jibs of cranes for the purpose of handling workpieces.

The object of the present invention is therefore to provide a system, the functions of which fill a gap that exists between what are called robots and the above-mentioned small materials-handling appliances. Although robots are capable of executing a large number of different movements on an automatic or remote-controlled basis, because of the very complicated techniques used therein they are mostly special appliances which are used only for very specific motional cycles in a production line. They are therefore extremely expensive. Specialization to deal with very specific problems inhibits their being produced in economical numbers and prevents reduction of their cost. Furthermore all these known appliances, when concerned with the handling of greater weights of material, are not manipulators but complete handling installations. In the case of individual appliances which can be moved as a unit, the known equipment, with few exceptions, is only able to deal with material weights of up to 30 kg at most.

Only when the workpieces are of low weight, e.g. up to approximately 5 or 10 kg, can they be held in a mechanically positive manner, and all other workpieces have to be held on the basis of their shape complementing that of the appropriate part of the handling equipment. Although gripping jaws for holding workpieces in a mechanically positive manner are known, the known gripping jaws forming part of manipulators perform their function imperfectly since greater weights of materials, particularly when their surfaces are greasy, can only be handled by means of extremely great clamping forces when jaws having a mechanically positive action are used. These great clamping forces also involve considerable weight which is a dead weight that has to be supported by the manipulator. However, the majority of manipulators make use of telescopic jibs resembling gun barrels, the angular position of which is variable. However, the greater the load to be handled on the long lever jib, the greater becomes the problem of oscillation, acceleration forces and gravitational forces.

A further object of the invention is therefore to improve the design of gripping jaws used in the equipment with which the invention is concerned and to provide them in a form in which they can be incorporated as assembly units in the system as a whole.

The invention therefore avoids the use of a telescopic jib, the angle of which can be varied in a vertical plane, and is limited to an arrangement known in crane technology and comprising an jib swivellable on a central column in a horizontal plane.

The invention therefore solves the initially posed problem and combines a plurality of individual solutions to provide a single general concept such that a surprisingly advantageous effect is achieved that, using the known techniques, would appear to be obtainable only at very much greater expense.

The following description of the drawings will deal with a number of further features which though inventive in themselves are not included in the claims.

In the drawings:

FIG. 4 shows, by means of a simple sketch, how the apparatus is used as a material-handling means, particularly for the purpose of introducing parts of electric motors into hollow spaces and for imparting other movements thereto;

FIG. 5 illustrates a form of the FIG. 1 manipulator wherein the jib itself is vertically displaceable, the supporting column forming a lifting mechanism;

Figure 7:
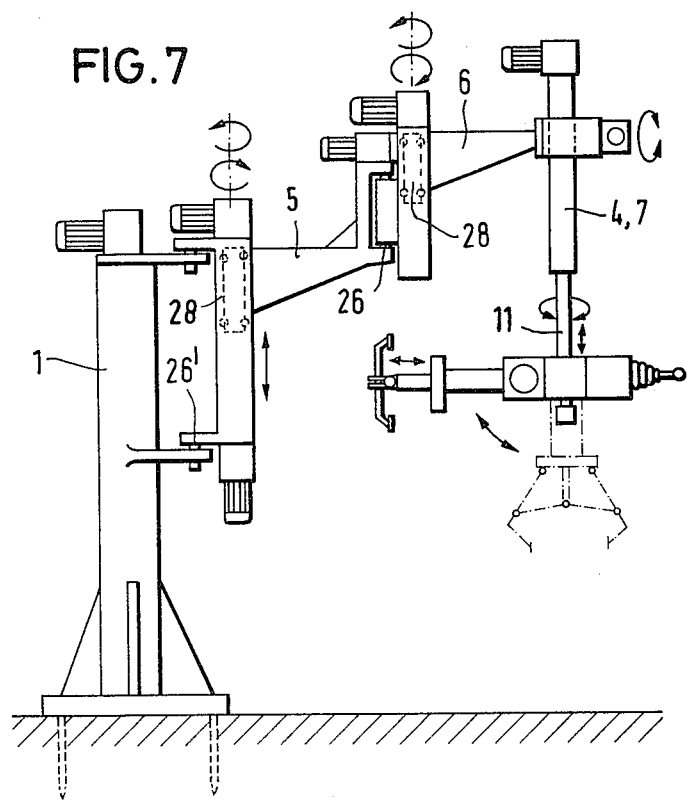
Figure 14:
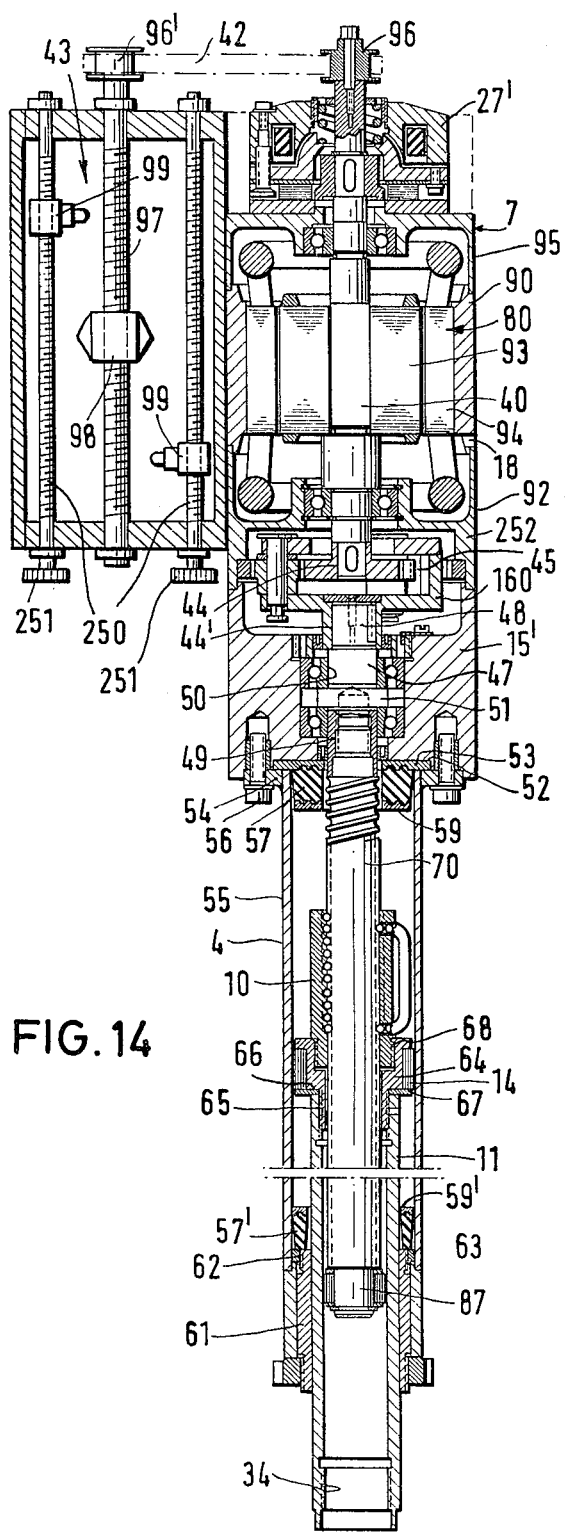
Figure 13:
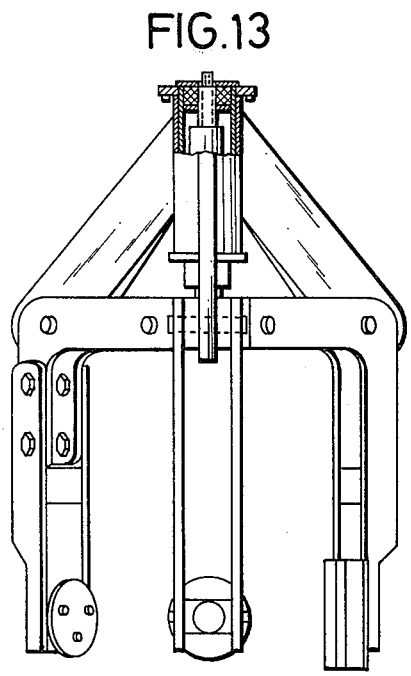
Figure 15:
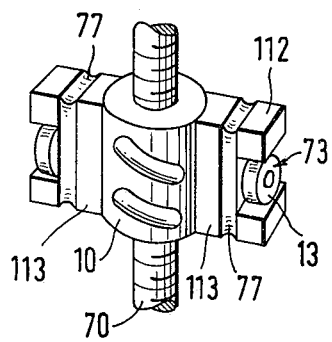
Figure 15A:
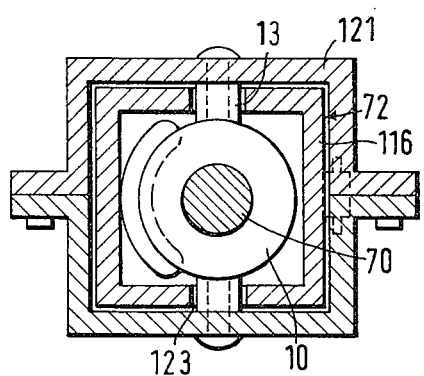
Figure 16:
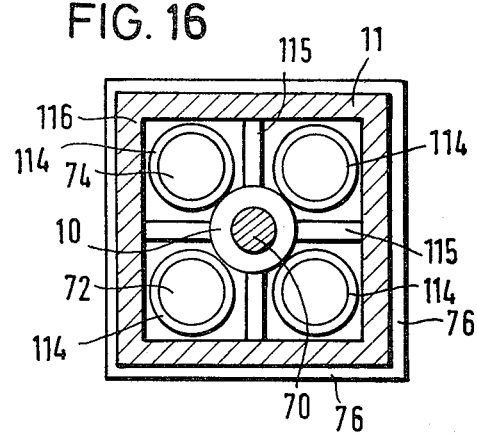
Figure 17:
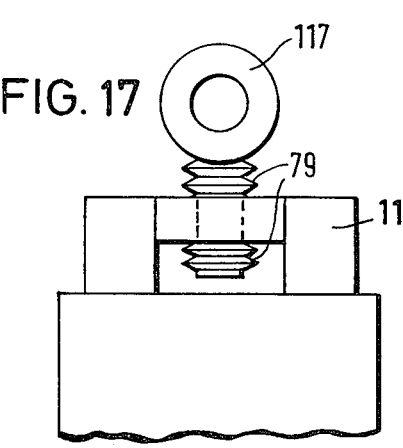
Figure 18:
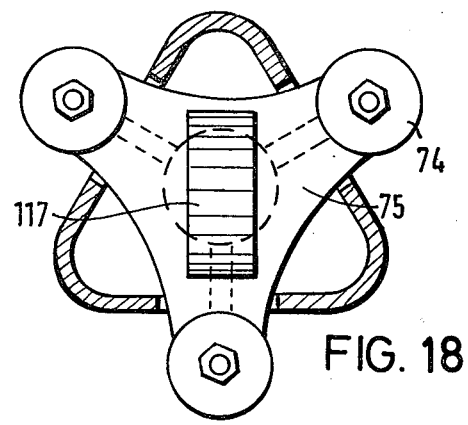
Figure 19:
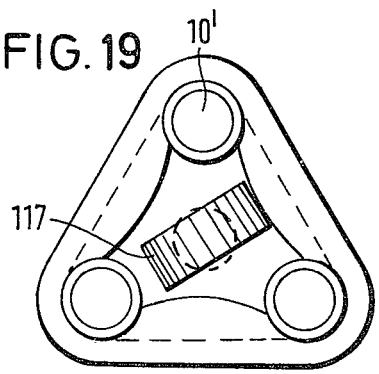
Figure 20:
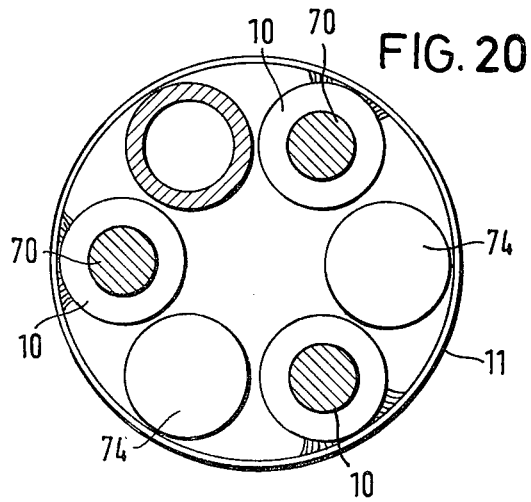
Figure 21:
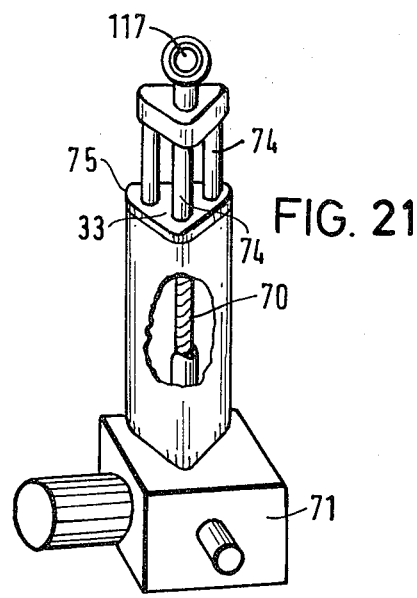
Figure 22:
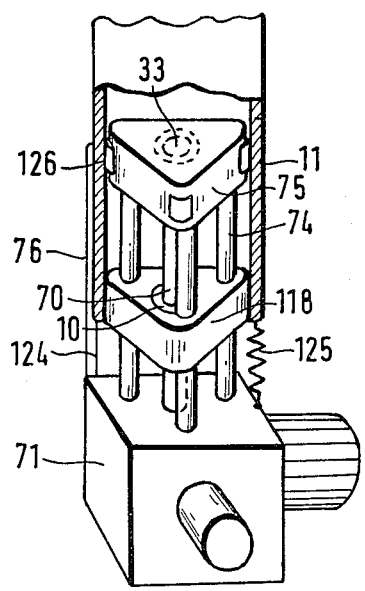
Figure 23:
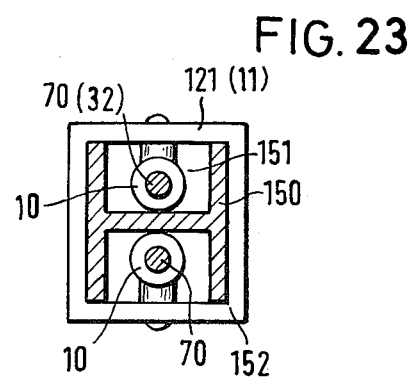
Figure 24:
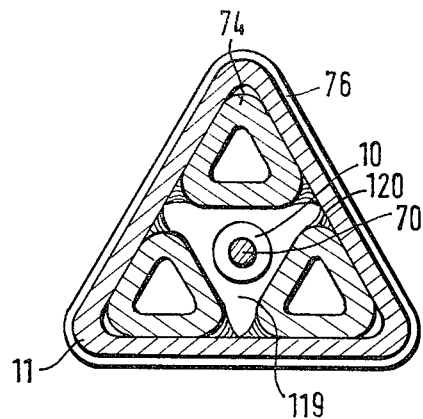
Figure 25:
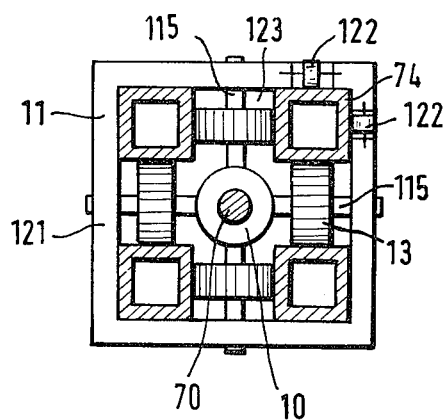
Figure 26:
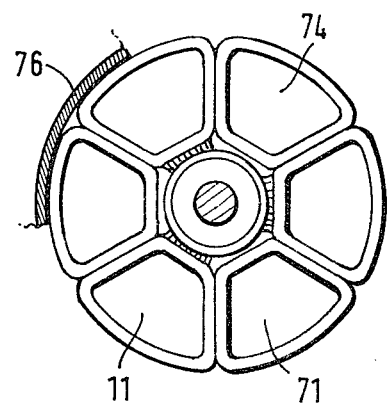
Figure 27:
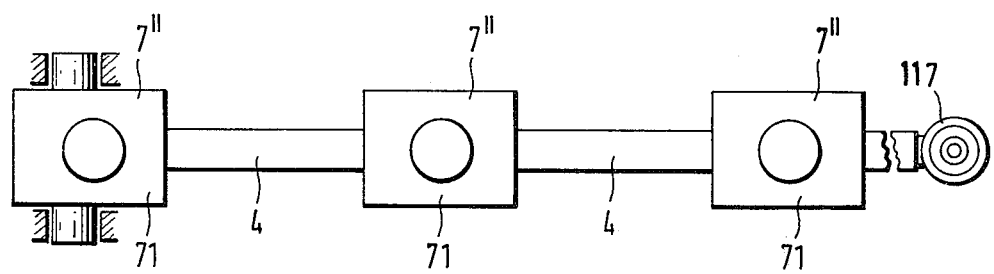
Figure 28:
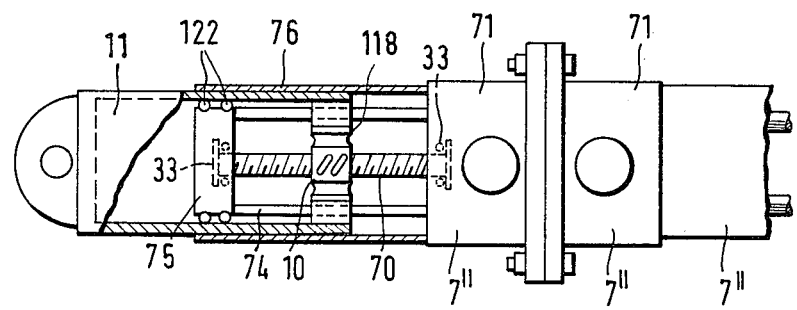

FIG. 7 supplements the illustrations provided by the previous Figures in that it shows positioning appliances or lifting drives which are arranged on or in the zone of the jib links and with the help of which the individual parts of the jib can be displaced vertically relatively to each other, greater vertical ranges and speeds of movement being obtainable;

FIGS. 8 to 10 illustrate the various elements of the spacing, swivelling and holding members, as well as the means for solving the difficult problem of current supply during electro-mechanical movements;

FIGS. 11 and 12 illustrate the form of a clamping drive for the jaws and how it is arranged in relation to a swivelling mechanism;

FIG. 13 shows a variant of the previously illustrated clamping jaws, wherein three jaws are used, the principle of combining the positioning appliance and the clamping jaws remaining essentially unchanged;

FIG. 14 shows the drive system for the vertical positioning appliance and the ball-and-spindle screw drive for the positioning device in accordance with the invention;

FIG. 15 shows a ball sleeve on a ball and spindle unit, and the means for connecting the ball sleeve to the sliding guide blocks, guide rollers or the like, resilient intermediate elements being used;

FIG. 15a supplements FIG. 15;

FIG. 16 illustrates an arrangement wherein the plunger is constituted by a closed outer tube;

FIG. 17 shows a resilient damping device for connecting the plunger to the load to be moved in the case of a positioning appliance of basically triangular form as shown in FIG. 19;

FIG. 18 is a view of the FIG. 19 arrangement in reverse;

FIG. 19 is a plan view of the end of a plunger with a connecting ring;

FIG. 20 shows how the column elements of a positioning appliance can be arranged in a circle and enclosed by an outer protective tube;

FIG. 21 is a perspective view of a positioning appliance in which the plunger consists of two separate tubes of triangular cross-section and the spindle is disposed within one closed triangular tube and is subjected only to tensile load;

FIG. 22 shows the FIG. 21 principle in reverse; here again the plunger, in the form of a triangular tube, encloses the column supporting the upper spindle bearing;

FIG. 23 illustrates a particularly simple double-spindle arrangement of rectangular cross-section;

FIG. 24 shows a further form having a triangular cross-section;

FIG. 25 is a variant of the FIG. 23 arrangement;

FIG. 26 shows how the telescopic parts of a positioning device can consist of individual tubes which, when fitted together, form a circle;

FIG. 27 illustrates a number of positioning appliances brought together to form a combined appliance;

FIG. 28 illustrates an arrangement in which the FIG. 26 system is limited to two interconnected positioning appliances having spindles subjected only to tensile load.

Mounted on a carrier member 1 by way of a vertical shaft 2 is a jib 3, which consists of an inner arm 5 and an outer arm 6 which are interconnected by way of a link 26 on which act a swivel mechanism 22 and a brake 27. A link 26', provided for the shaft 2, also has a swivel drive 22 and a brake 27. The appropriate electric motors are designated by the numeral 80. The drive elements 18 of a swivel mechanism 22' are fitted in the space within the outer arm 6, designed as a hollow beam, and turn a clamping block 81, which holds a positioning appliance 70 at a rigid angle in relation to the jib and can therefore swivel in the manner of a propeller. In order to enable the positioning appliance 7 to be displaced relatively to the clamping block 81, said appliance is provided with a toothed bar 82 which meshes with a simple toothed crank drive 83.

The positioning appliance itself consists of an outer telescopic element 4 and an extensible telescopic element 4' which forms a plunger 11. Rotatably mounted on the latter is a bearing element 15, on the connecting faces 16 of which bear spacing elements 17 on which are arranged load-holding members 9, for example the positioning appliance 7'. Instead of the toothed crank drive 83, a second positioning appliance 25, acting as a lifting mechanism 28, can be so arranged parallel to the first positioning appliance 7 that the motional cycles of the bearing element 15 relative to the arm 6 are composed of the movements of the two positioning appliances 7 and 25.

Figure 1:
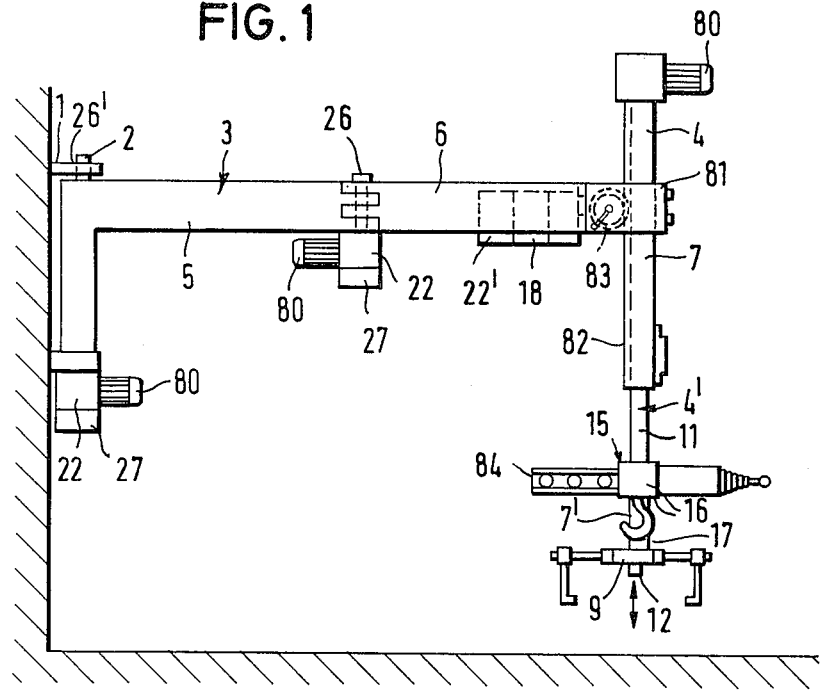
FIG. 1 is a side view of the manipulator of the invention equipped with an insertion and/or extracting device.
Figure 2:
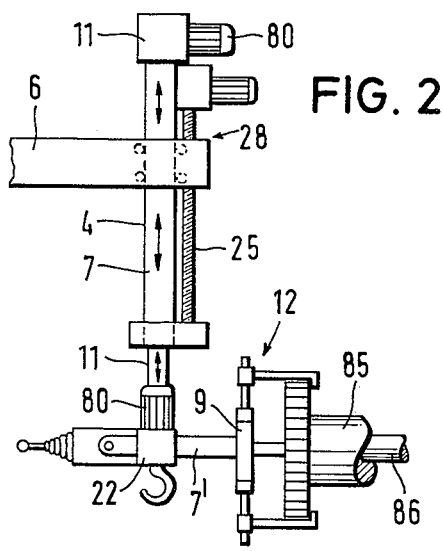
FIG. 2 shows the manipulator of claim 1 when use is made of a second positioning appliance for vertically displacing the first positioning appliance.

A support beam 84 can be used for connecting further parts. To supplement the details of FIG. 1, FIG. 2 shows the positioning appliance 7' swung through 90°, and the bearing element 15 rotated through 180°. The load-holding members 9 are designed as an extracting and insertion device 12. A shaft 86 is illustrated diagrammatically as being pushed out of a workpiece 85. The positioning appliance 7' together with the load-holding members 9 can be swivelled through 90° or more by means of the swivel mechanism 22.

Figure 3:
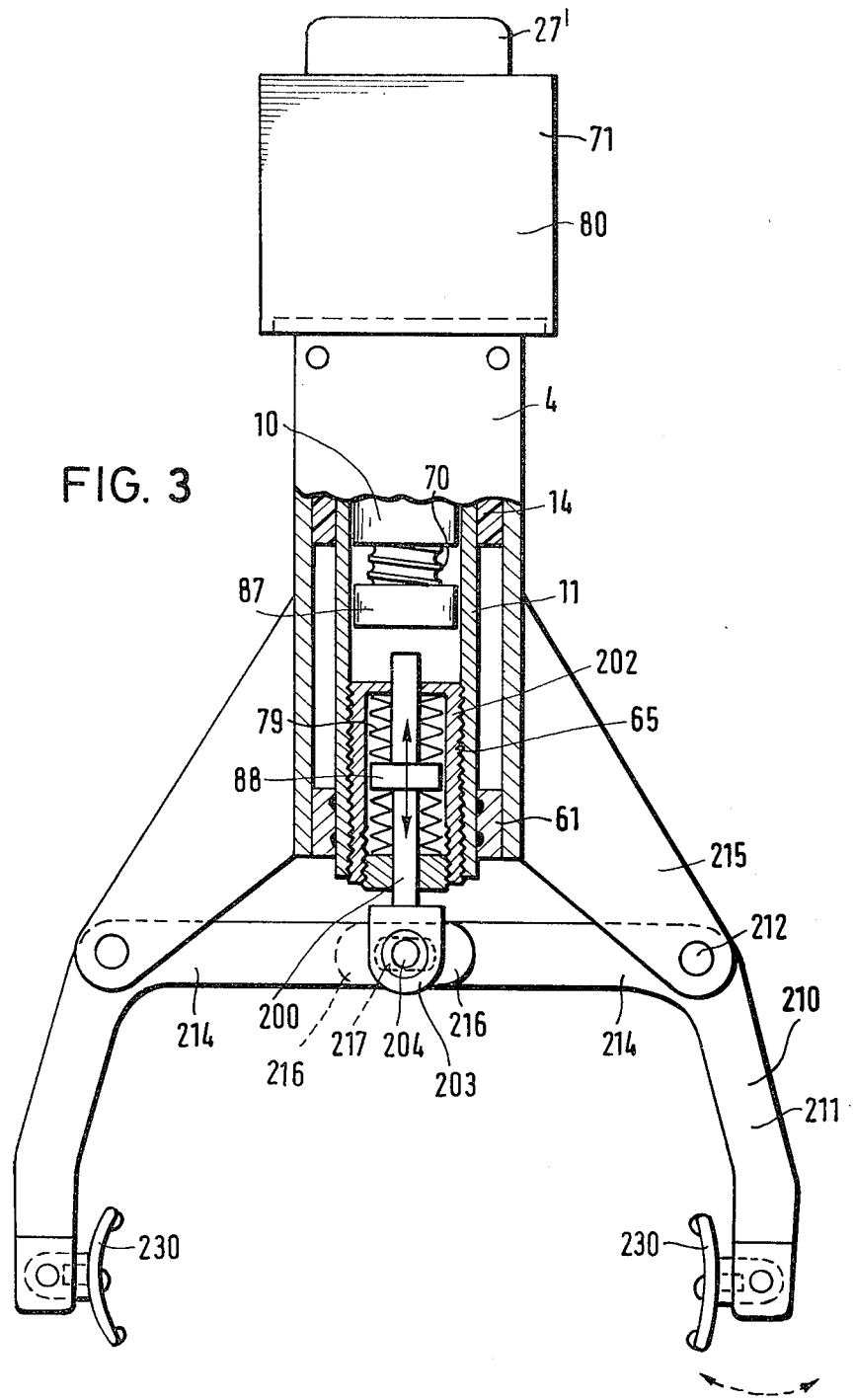
FIG. 3 illustrates the basic construction of the clamping jaws that are so important as regards the functioning of the apparatus of the invention.

FIG. 3 illustrates in principle the construction of the clamping jaws in accordance with the invention. The design and arrangement of the drive blocks 71 and of the brake 27 are not illustrated. The positioning appliance is shown partly in section, and it can be seen that the outer guide tube or telescopic element 4, together with the plunger 11, is connected to a slide ring 14. The plunger surrounds a ball sleeve 10. The end of a spindle 70 and the spindle guide 87 can be seen. The plunger is guided in a guide bush 61. (The function of the positioning appliance 7' forming the clamping drive is described in connection with FIG. 14). The plunger has a female thread 65 into which a sleeve 202 for receiving stacks 79 of spring washers is screwed. The stacks of spring washers are separated by the flange 88 of the connecting part 200 and are biased towards each other. The connecting part 200 carries a bifurcated head 203, the pins 204 of which extend through slots 217 in the ends 216 of the limbs 214.

At the point of intersection 212 of the two angled arms 211 and 214 of a toggle lever 210, the latter is mounted on a carrier 215.

If matching plates 230 have been applied to the workpiece and the plunger 11 continues to move, the spring washers 79 are loaded until the set torque of the drive motor no longer suffices to increase the clamping action. The brake 27' then drops in, and the jaws remain in the clamping position for an indefinite period.

FIG. 4 provides a perspective view showing how, in the case of an extremely simple form of the manipulator of the invention, a workpiece can be picked up by the holding members and introduced for example into a stove or furnace 110. The jaws can be actuated by means of a simple master switch 111.

Figure 4A:
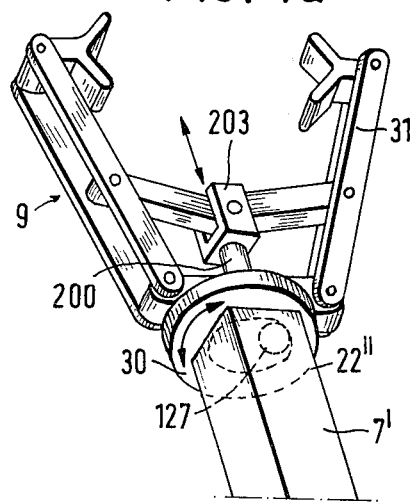
FIG. 4a illustrates, on a larger scale, the jaws illustrated in FIG. 4 and shows how it is possible to turn the clamping jaws relatively to the actual positioning appliance so that the workpiece, e.g. the stator illustrated in FIG. 4, can be rotated inside a lacquering installation or a stove.

The perspective view shown in FIG. 4a illustrates a form of construction of a rotatable load-holding member 9. Adjacent the bearing member 15 is a positioning appliance 7', to the end-face of which is rotatably connected a bearing plate 30 which is rotatable, for example, by way of an internally toothed ring and with the aid of a pinion driven by the spindle. These details are not illustrated since they are of simple construction. It is of course necessary that the ball sleeve should be capable of being disengaged from the spindle. However, it is also possible to connect the drive motor to the spindle by way of a disconnectible clutch and to use a drive shaft parallel to the spindle.

To supplement the details shown in FIGS. 1 and 2, FIGS. 5, 6 and 7 illustrate possible forms of additional lifting mechanisms 28. In FIG. 5, the carrier member 1 (lifting spindle 32) is designed as a lifting column, and in FIG. 7 the additional lifting mechanisms 28 are associated with the links 26 and 26'. Thus the lifting movement of the positioning appliance 7 is increased, and the field of application is widened.

Figure 6:
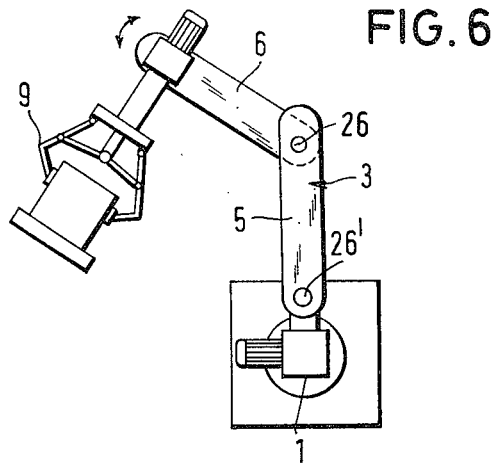
FIG. 6 is a plan view of the FIG. 5 manipulator which shows the motional cycles of the jib parts more clearly.

FIG. 6 shows more clearly the range over which the load-holding members 9 can be swung in relation to the non-rotatable plunger 11 over a horizontal circular path, and this Figure also illustrates the possible swivel movements of the outer arm 6 relatively to the inner arm 5 of the jib 3.

The lifting spindle 32 in the carrier member 1 is mounted on tensile bearings 33 at the upper and lower ends of the carrier member 1.

FIGS. 5 and 6 illustrate the limited swivel range of the inner arm 5 of the jib 3 on the link 26'. In addition, a swivel mechanism 28 is provided at the foot of the carrier member 1 within a ring mount 89 carried on ball-bearings. The lifting mechanisms 28 which, in FIG. 7, are associated with links 26 and 26', permit vertical parallel displacement of the arms 5 and 6 in relation to each other and to the carrier member 1.

Referring to FIG. 8 and as previously mentioned, the bearing member 15 is rotatably fitted on the plunger 11, and the housing 90 of the motor 80 is secured to one of the faces 16 of the bearing element 15 by way of screw-bolts 91. Then follow two gear case sections 92 and a current distributor 220, the housing 24 of which carries on its upper surface a brush holder 153 and a connecting cable 154. All these casing sections form spacing elements 17 and drive elements 18. Extending from the current-distributor housing 24 to the rear of a robust bearing, not visible, is a drive shaft 219 on which can be mounted a sleeve which can be connected to the unit constituted by the clamping jaws 225. The two positioning appliances 7' of this unit are offset laterally from each other and overlap each other in the lengthwise direction. The clamping openings 218 between the jaws face in opposite directions. The operation of the jaws has already been described.

FIG. 9 shows a somewhat different arrangement of the drive and spacing elements 17 and 18 from that seen in FIG. 8, since, instead of a lateral connecting face 16 on the bearing member 15, the lower face is used.

FIG. 10 shows the current distributor 220 with its shaft bearings 221, details of which are not of critical importance to the invention.

The individual elements shown in FIG. 11 and their functions do not require to be explained since the function of jaws in accordance with the invention, particularly of the positioning appliance shown in FIG. 3, has already been described in detail. In the case of FIG. 11, there is offered the additional possibility of turning the entire positioning appliance relatively to the connecting block 232, designed as a bearing member comprising bearings 211 and as a current distributor 220. The telescopic element 4, which forms the outer tube of the positioning appliance 7', is connected to a rotatable collar 234. The appliance can be turned by means of a hand-wheel 237 and, when turned, secured by the disc-brake 235, 236.

FIG. 12 is intended to show how the current distributor 220, forming a bearing member for the drive shaft 219, is connected in a parallel offset position relative to the swivel gears 222 and the drive shaft 224, and how the drive shaft 219 can be driven by toothed belts 223. This Figure shows the propellor-like arrangement of the clamping jaws unit 225 and the mutual overlapping of the positioning appliances 7' and the arrangement whereby they face in opposite directions.

FIG. 13 calls for no description since this is simply intended to show a modified form of the FIG. 3 clamping jaws comrising two clamping elements, the jaws shown in FIG. 13 having three such elements.

In FIG. 14, the limit switch 43 is shown as being turned through 90° so as to enable its function to be seen more clearly. In practice, the limit switch 43 is a flat casing which is fitted to the side-faces of the drive parts of the positioning appliance 7.

The rotor 93 of the electric motor 80, contained in a housing 90, is mounted on its shaft 40 within the stator winding 94. The space within the motor is closed off by a bearing cap 95. Associated with the rotor shaft 40 is a steady-current brake 27' to which is connected a drive wheel 96 which is shrunk on to the end of the rotor shaft or on to the end of another shaft engageable with the rotor shaft. This wheel drives a belt 42 by way of a wheel 96' and thus also drives a threaded spindle 97. A nut 98 is mounted on this spindle. By way of suitable cam systems this nut acts on switching elements 99. The switching elements 99 are displaceable by threaded spindles 250 with the aid of knobs 251.

The motor housing 90, open at the bottom, is closed off by a cover 252 which acts as a bearing cover for supporting the output end of the shaft of the motor, and also has at its lower side an opening which forms part of a gear casing or a section 92 of a gear casing. The lower part of this casing is formed by a recess machined out of the bearing member 15'. If more than one reduction stage are required in the planetary gear 45, a corresponding number of intermediate elements are inserted. The output shaft-stub acts as a carrier for the sun wheel and is connected thereto by means of a plug connection 44. Since the construction of planetary gears is known, it does not require to be described here. The planetary wheel carrier 160 is connected by the plug connection 44' to the journal 48 of the intermediate shaft 47. This intermediate shaft has a flange 51 which is clamped between ball-bearing inner races 50 so that it is able to transmit compressive and tensile forces. At the output end, the intermediate shaft forms a threaded bush 49 into which is screwed and thus secured a screw-threaded end of the spindle 70. An opening 52 in the end-face of the bearing member 15' serves for securing the non-circular outer tube 55 (corresponding to the telescopic part 4) with the aid of the foot 54 and suitable screws 56. Inserted between the foot 54 and the base of the cut-away portion is a plate 53, which is connected by vulcanization to a damping cushion 57, to the upper surface of which is connected a stop plate 59, likewise by vulcanization. The damping cushion is tapered so that it has clearance of motion upon deformation. Upon encountering the plate 59, the ball sleeve 10 can be arrested by the damping cushion 57, and force peaks are thus reduced. The ball sleeve is screwed by means of the female thread 68 to a carrier 64 for the slide ring 14. The slide-ring carrier 64 itself terminates in a threaded sleeve, the male thread of which is screwed into the female thread 65 on the plunger and thus presses the slide ring, by way of an inserted disc 67, against an end flange 66 of the carrier. Within the plunger, the end of the spindle is guided by means of the spindle-guide element 87.

The plunger 11 is guided in the guide bush 61, the inner end 62 of which is connected with a carrier for the damping cushion 57'. The plunger 11 is a simple smooth tube of circular cross-section which has a female thread 34 at each end. The upper female thread serves to connect the ball sleeve 10 by way of the slide ring carrier 64, whereas the lower female thread 34 is used to connect an intermediate shaft which is mounted in the bearing member 15 in the same way as the intermediate shaft 47 is mounted in the bearing member 15 shown in FIG. 14.

FIGS. 15 and 15a show a spindle 70 with a ball sleeve 10 which requires to transmit only tensile forces. It is mounted at both ends in tensile bearings 33. These allow the spindle a small axial play. The ball sleeve 10 carries two lateral connecting parts 113 with damping cushions 77 which are able to twist resiliently; said sleeve also carries the parts 112 comprising rollers 13 and roller bearings 73 and serving for effecting the connection with the plunger. The rollers 13 run in slots 123 formed in a column 72 firmly connected to the drive parts.

In FIG. 16, the slotted tube 116 of rectangular cross-section is formed by four tubes 114 which constitute the individual columns 74 of the column 72 solidly connected to the drive elements e.g. 71. At their upper ends they carry the bearing support 75 and the upper tensile bearing 33 for the spindle 70. The webs 115, which form the connection with the ball sleeve 70 and are solidly attached to the plunger 11, correspond to the connecting parts 113, 77 and 112 in FIG. 15, but are of cruciform arrangement. The plunger 11, consisting of a tube 116 of rectangular cross-section, it itself again guided in a third telescopic part 76 which, like the individual columns 74, is rigidly connected to the drive blocks 71. A telescopic part 76 of this kind can be used for taking up the bending forces, but it may also simply be a protective tube.

FIG. 17 is a side view of the end zone of a plunger. As far as possible, the plunger should apply its force by way of resilient damping intermediate elements. For this purpose the force-transmitting part is an axially displaceable ring 117 which is damped in both directions by means of stacks 79 of spring washers. This connecting ring 117 is also seen in plan view in FIGS. 18 and 19. Also, the plunger 11 shown in FIG. 17 corresponds to the plan view of FIG. 19 which, again in conjunction with FIG. 21, shows substantially the same construction.

FIG. 18 is a simplified plan view which shows that the invention can be reduced to practice using a wide variety of constructions. As in FIGS. 17 and 19, the plunger is formed by individual columns 74 of triangular arrangement. These columns however are located outside the carrier 75 for the upper tensile bearing 33 which can be formed by a tube of triangular cross-section slotted three times, or by three angled carriers.

FIG. 20 shows that, within the plunger 11, forming an outer tube, ball sleeves 10 can be connected to the inside of the plunger tube in a resilient manner to effect damping, whereas the individual columns 74 carry the upper bearing 33 as in FIG. 22 wherein the plunger 11 is formed by a tube of triangular cross-section.

Fig. 21, which is comparable with FIGS. 17 and 19, is a perspective view which again indicates the possibility of dividing the plunger into a plurality of columns and of guiding these in the upper bearing carrier 75 in which the upper tensile bearing 33 of the spindle 70 is also arranged.

In the FIG. 22 arrangement, the ball sleeves or the single ball sleeve 10 illustrated are or is accommodated in the plunger-tube connector 118 through which extend the individual columns 74 which are in turn anchored on the drive block 71. Between the lower end of the plunger 11 and the drive block 71 is a variable space 124 which can be sealed off by bellows 125 or the like, or by a further guide tube forming a third telescopic part 76. At their upper ends the columns 74 carry the bearing carrier 75 for the upper tensile bearing 33 which can be guided by guide rings, rollers 126 or the like within the plunger tube.

FIG. 23 illustrates a very simple form of the positioning appliance. As in FIG. 16, the plunger 11 is formed by a square tube 121 to which are secured the ball sleeves 10 in a manner similar to that shown in FIG. 15. The square tube 121 surrounds an H-section carrier 150 and is guided thereon. At its upper end the H-section carrier 150 terminates, in a manner not illustrated, in an end piece forming a bearing carrier 75 which supports the tensile bearing 33 for the two spindles 70. An outer tube 76, not illustrated, can be provided as a third telescopic part.

Referring to FIG. 24, the plunger 11 is again a closed tube of triangular cross-section which is surrounded by an outer protective tube 76. The ball sleeve 10 surrounds the spindle 70 and is embedded in a triangular carrier member 119. Its angled ends are connected to the plunger 11 by means of damping cushions 78 which can twist in a resilient manner. The individual columns 74 serve for guiding the plunger 11 and are therefore movable relatively to the plunger and to the carrier for the ball sleeve 10. Here again, a protective tube is used as a third telescopic part 76.

FIG. 25 shows a variant of the FIG. 16 arrangement. The individual columns 74 are square tubes 121, and these are moved relatively to the plunger, also forming a square tube 121, by means of guide rollers 122. Rollers 13 can also be provided between the square tubes 12 which are mounted on webs 115.

FIG. 26 is intended to show that the individual columns 74, forming the plunger 11, and those forming the other telescopic part can be so shaped that together they form substantially a closed circle which can be surrounded by a third telescopic part 76.

FIG. 27 illustrates a series arrangement of individual positioning appliances 7″ of any required form, but particularly of a form whereby the spindles are subjected only to tensile load. The drive blocks 71 form joints of a carrier resembling a bamboo stick in such a way that the carrier as a whole can be expected to withstand bending forces that could not be dealt with by a single positioning appliance of the same dimensions and having a correspondingly long stroke. The speeds of stroke of the individual positioning appliances can be added to each other, or when the direction of movement is reversed, subtracted one from the other. This can be of very great importance when, for example, positioning appliances are required to move heavy loads slowly, but also small loads very quickly. When a plurality of positioning appliances 7′ are used in combination, the total tensile or compressive forces that can be transmitted are not very much different from those that can be handled by individual appliances, though lengths of stroke and speeds can be achieved that were previously only possible at very great expense.

FIG. 28 illustrates the combination of two individual appliances obtained by connecting two drive blocks 71 to each other. The sectioned plunger 11 and the sectioned third telescopic part 6 permit a view of the bearing carrier 75 for the upper tensile bearing 33. In this illustration it again becomes clear that the spindle 70 is mounted only in tensile bearings 33 and transmits tensile forces in both directions so that it cannot be subjected to bending load. The carrier 75 is guided within the plunger 11 by guide rollers 122 for example. A ball and spindle unit of normal dimensions, obtainable on a series-production basis, can be used. When subjected to tensile load it behaves like a rope.

If this does not suffice as a result of a longer stroke being required, a plurality of positioning appliances can be arranged in series. All bending forces and all compressive forces are taken up by the telescopic parts. If, as required in the past, very thick special spindles were produced for transmitting greater forces and using long strokes, a positioning appliance arrangement of this kind would cost many times more than the apparatus of the invention. Positioning appliances for large forces and long strokes have therefore hardly been used at all in any great numbers.

We claim:

1. A manipulator comprising a jib adjustable about a vertical axis, an extensible elongate support unit carried on the jib, the support unit extending vertically downwards relative to the jib, and a load holding unit carried by the lower end of the support unit, the support unit including a housing, a guide, a screw-threaded spindle, means for selectively driving the spindle in rotation, a non-rotatable ball sleeve associated with the spindle, a support plunger operatively connected with the ball sleeve whereby the plunger is adjustable vertically in response to rotation of the spindle, a bearing element detachably mounted on the plunger at its lower end, said bearing element having at least one mounting face, a spacing element secured to said mounting face, the load holding unit connected to the spacing element, said spacing element being adapted to permit swivelling movement of the load holding unit relative to the bearing element and to clamp the same in position, wherein said support unit is secured against angular movement relative to the jib and the housing thereof is adjustable in the vertical sense relative to said jib.

2. A manipulator according to claim 1, wherein said load holding unit includes adjustable jaw members and means for moving said jaw members, said means including a guide, a jaw moving plunger adjustable relative to said guide, a screw-threaded spindle, means for selectively driving said screw-threaded spindle in rotation, and a ball sleeve associated with said spindle and connected to said jaw moving plunger.

3. A manipulator according to claim 1, including a screw-threaded spindle mounted in bearings carried by the housing of said extensible support unit, said spindle extending through said jib, ball sleeve means associated with said jib and with said spindle, and means on said support unit for selectively driving said spindle in rotation.

4. A manipulator according to claim 1, including a rack and pinion drive for adjusting the support unit relative to said jib.

5. A manipulator according to claim 1, wherein said jib includes two arms articulated together about a vertical axis, and operating means for selectively adjusting the relative positions of said arms, said operating means including drive means and brake means, said support unit being adjustably mounted on said second arm, and said first arm being supported for movement about a vertical axis by means including drive means and brake means.

6. A manipulator according to claim 5, including a mast, a carriage movable vertically within said mast by means of a drive system including a screw-threaded spindle journalled in bearings in said mast, and means for selectively driving said spindle in rotation, and a ball sleeve on said carriage, said first arm being supported on said carriage.

7. A manipulator according to claim 2, wherein said load holding unit includes extensible means for advancing and retracting said unit.

8. A manipulator according to claim 2, including a bearing plate to which said jaw members are pivoted, and gearing for driving said plate in rotation to swivel said jaw members.

9. A manipulator according to claim 1, wherein said spacing element is adapted to be turned through at least ninety degrees relative to said bearing member.

* * * * *